Jan. 25, 1938.  G. W. ELSEY  2,106,272
SHOCK ABSORBER
Filed July 15, 1936  3 Sheets-Sheet 1

Inventor
GEORGE W. ELSEY
By Spencer, Hardman and Ochs
Attorneys

Jan. 25, 1938.　　　　G. W. ELSEY　　　　2,106,272
SHOCK ABSORBER
Filed July 15, 1936　　　　3 Sheets-Sheet 2

Inventor
GEORGE W. ELSEY
By Stenow, Hardman and Ehr
Attorneys

Jan. 25, 1938.  G. W. ELSEY  2,106,272
SHOCK ABSORBER
Filed July 15, 1936   3 Sheets-Sheet 3

Inventor
GEORGE W. ELSEY

By
Attorneys

Patented Jan. 25, 1938

2,106,272

UNITED STATES PATENT OFFICE 2,106,272

SHOCK ABSORBER

George W. Elsey, Dayton, Ohio, assignor to General Motors Corporation, Detroit, Mich., a corporation of Delaware Application July 15, 1936, Serial No. 90,646

4 Claims. (Cl. 219—10)

This invention relates to improvements in hydraulic shock absorbers and the method of producing them.

It is among the objects of the present invention to provide a hydraulic shock absorber adapted to be connected directly to the frame and axle of a vehicle, the shock absorber being of a simplified structure and design and capable of being produced commercially at a minimum cost.

The structure of the shock absorber is simplified and its production costs reduced to the minimum by the use of a welded structure in place of an integral unit in the form of a casting or forging, either of which is of comparatively greater cost than a welded assembly.

This welded assembly comprises a piston shaft having a highly polished, smooth surface, a disc and a ring.

The present invention not only provides for a simplified shock absorber structurally, but also an improved method and means for electrically welding the parts of the aforementioned assembly so that no element of the assembly may inadvertently be damaged during the welding operation. This is particularly desirable and necessary in the present instance, for damage to the highly polished and smooth surface of the piston shaft would result in excessive wear of the packing gland which slidably engages and supports said shaft to provide a leak-proof seal at one end of the shock absorber. Ordinary methods of electric welding do not positively protect the highly polished surface of the shaft against burning and pitting. However, with the improved method of the present invention these possibilities are entirely eliminated.

Further objects and advantages of the present invention will be apparent from the following description, reference being had to the accompanying drawings wherein a preferred embodiment of the invention is clearly shown.

Figures 1, 2:
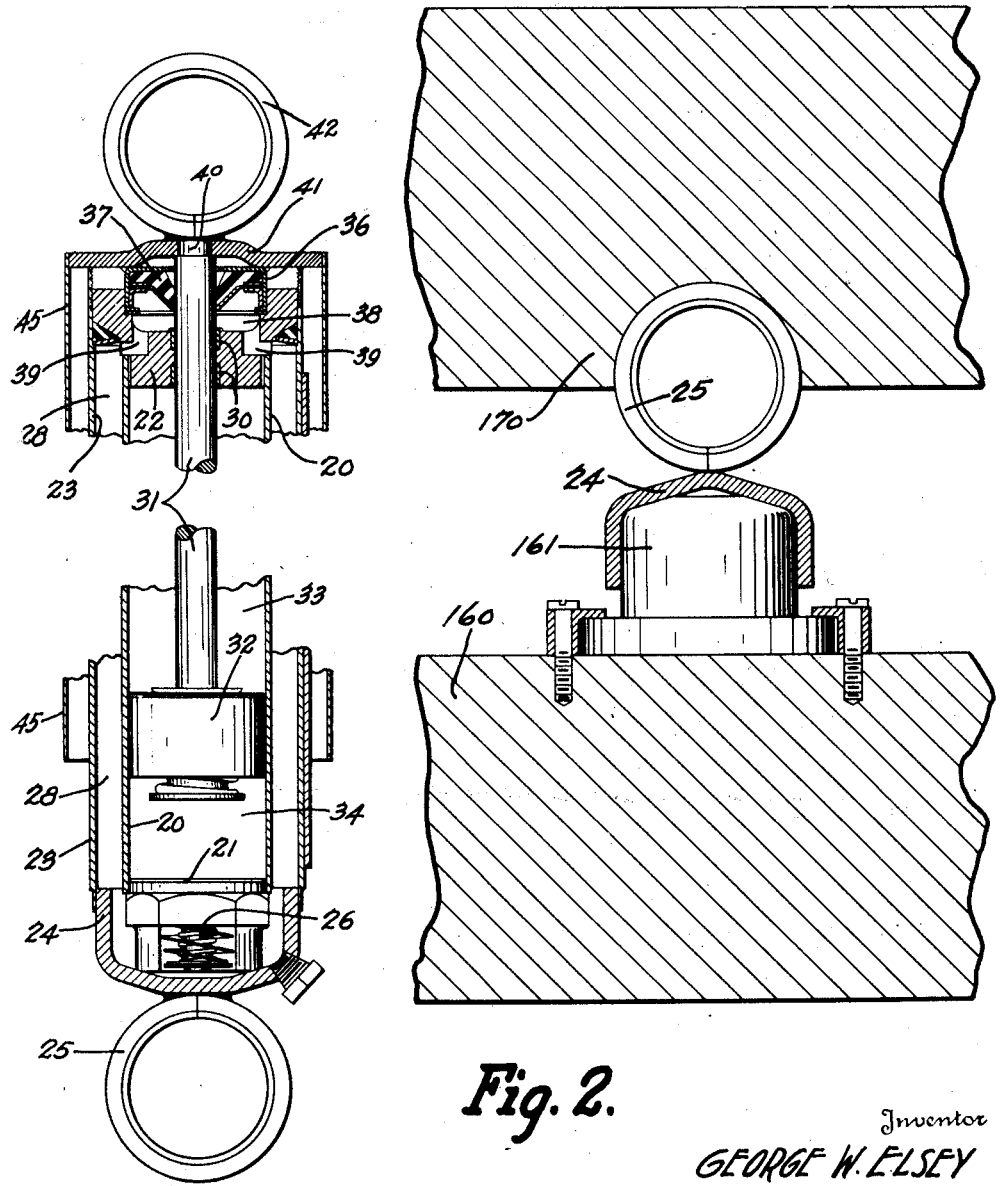
Fig. 1 is a fragmentary longitudinal sectional view of the hydraulic shock absorber.
Fig. 2 illustrates the fixture for assembling the lower end cap of the shock absorber, which comprises a cup and a ring-shaped element.

Referring to the drawings, the shock absorber is shown comprising a cylindrical member 20, closed at its lower end by the cylinder head 21 and at its upper end by the closure member 22. Concentrically surrounding this cylindrical member 20 is a tubular member 23, to the lower end of which is attached the cap 24 provided with a mounting ring 25. The cylinder head 21 of the cylinder 20 rests upon the cap 24 and is apertured to receive valve mechanism 26 for controlling the flow of fluid between the chamber 27 in the cup and the interior of the cylinder 20. The upper end of the tubular member 23 fits about the closure member 22 as shown in Fig. 1. Tubular member 23 provides the annular space 28 about the cylinder 20. Said annular space may be termed the "fluid reservoir" of the shock absorber. Bearings 30 in the closure member 22 slidably support the piston shaft 31, to the inner end of which is secured the piston 32 reciprocable within the cylinder 20, dividing said cylinder into two fluid displacement chambers 33 and 34. Any suitable valve mechanism in the piston 22 controls fluid flow through the piston between these chambers.

The closure member 22 is recessed to receive a packing box 36 provided with a packing gland 37 which slidably grips the piston rod 31 so as to provide a leak-proof seal, preventing any fluid which might leak from the chamber 33 past the bearings 30 into the space 38 in the closure member from creeping to the outside of the shock absorber. Any fluid gathering in the chamber 38 is adapted to return to the fluid reservoir 28 through the passages 39 provided in the closure member.

The outside end of the piston rod 31 has a reduced portion 40 upon which the apertured disc 41 fits. A ring member 42 is attached to the end of the shaft 31 and to the disc 41 and is used for mounting or securing the piston rod to the frame of the vehicle upon which the shock absorber is used. The mounting ring 25 in turn is secured to the axle of the vehicle. The disc 41 has one end of a tubular member 45 secured thereto, this tubular member telescoping the tubular member 23 and thus providing a dust cap which substantially prevents any dust or grit from reaching the shaft 31 when the shock absorber is extended and portions of this shaft are exposed beyond the outer confines of the packing 37.

Heretofore it has been the practice to make a casting or drop forging of the elements comprising the ring 42 and the disc 41, this integral piece being threaded or secured to the shaft 31 in any suitable manner. The use of a casting or drop forging for this portion of the shock absorber requires machining and is considered more expensive than where stampings are used and welded together into a unitary structure.

The present invention provides for a welded assembly to be used in place of a casting or drop forging, this welded assembly comprising the disc 41 punched from ordinary sheet metal and press-fitted upon the reduced end 40 of the shaft and a punched split-ring member 42 placed at the end of the shaft and adjacent the disc 41 and by electric welding, fusing the contacting surfaces of these three electrodes.

The nature of the shock absorber requires that the shaft 31 has an exceedingly highly polished surface, slidably engaging the bearings 36 and the packing 37, for if this shaft be rough to even a slight degree, such roughness would create excessive wear upon the bearings and particularly the packing 47, resulting in a leak of fluid from the shock absorber and entirely destroying the function of the packing gland. For this reason it is necessary to maintain this exceedingly highly polished surface smooth and entirely eliminates the possibility of rough spots thereon. Welding the shaft 31, the disc 41 and the ring 42 together by the ordinary method usually results in pit marks in the highly polished surface of the shaft, and applicant therefore conceived the idea of providing an improved method of welding these parts together.

Figure 3:
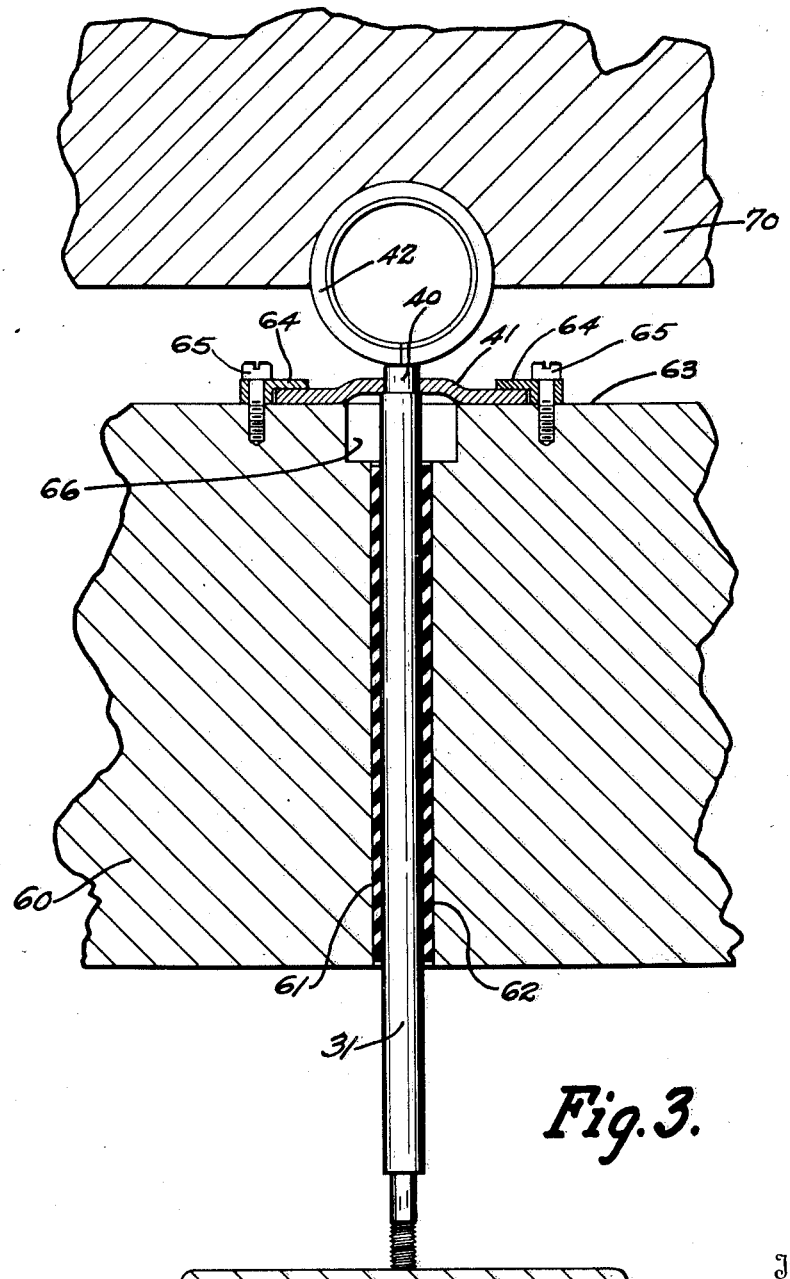
Fig. 3 is a sectional view of the assembly or welding fixture for assembling the shaft, disc and ring-member of the shock absorber.

In the Fig. 3 a fixture for this welding operation is clearly illustrated as comprising a rigid block or electrode 60 having a hole 61 therethrough which is provided with an insulating sleeve 62. This sleeve has an interior diameter adapted to receive the piston shaft 31. After the disc 41 is pressed upon the reduced end 40 of the piston shaft 31, the assembly is placed in the electrode 60 so that the shaft extends through the insulating sleeve 62 and disc 41 rests upon the upper surface 63 of the electrode. Clamps 64 are then placed upon the disc 41, and by means of screws 65 these clamps are actuated to tightly press the disc 41 into electrical engagement with the electrode 60. It may be seen in Fig. 3 when the piston rod or shaft 31 and its disc 41 are secured in position in the electrode 60, the shaft per se does not engage any part of the electrode, for the insulating sleeve 62 isolates the shaft from the electrode and a counterbore 66 in the upper surface of the electrode entirely eliminates the possibility of current jumping over from the upper surface of the electrode to the shaft or rod 31 and thus causing burns or pitting at this point. After the rod and disc are placed in the rigid electrode 60, the split ring 42 is placed upon the end of the shaft or rod 31 extending beyond the outer surface of the disc 41. Then the movable electrode 70, recessed to receive ring 42, is brought into engagement with said ring and pressure is exerted by the movable electrode 70 upon the ring, urging it into pressing engagement with the end of the shaft 31. This contact between electrode 70, ring 42, shaft 31, disc 41 and the opposite electrode 60 causes current to flow between the opposite elements through the ring shaft end and disc, resulting in a fusion between the contacting surfaces, the end of the shaft becoming molten and flowing so that the ring 42 is brought into direct and actual engagement with the disc 41, as shown in the Fig. 1.

Figure 4:
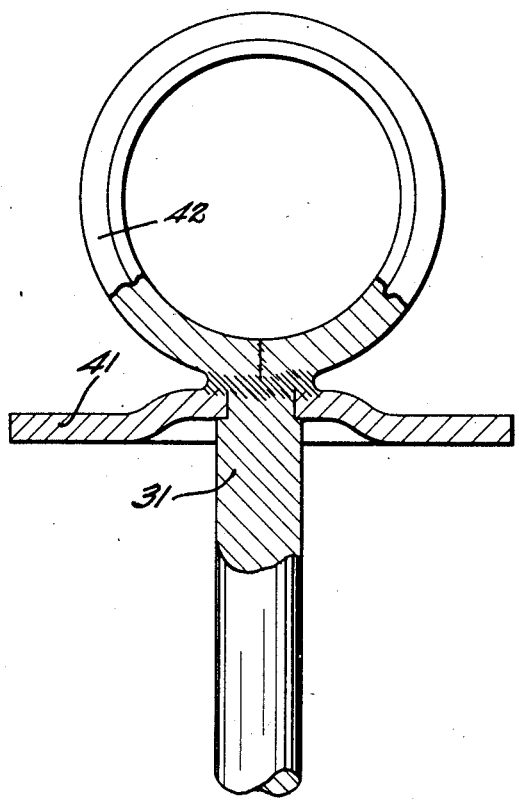
Fig. 4 is an enlarged part sectional view showing the shaft, disc and ring-member assembled.

The Fig. 4 illustrates diagrammatically the fusion or bonding of the adjacent contacting surfaces of the ring 42, disc 41 and piston shaft or rod 31.

It may readily be seen that there is no possibility whatever of arcing or sparking taking place at the highly polished surface of the rod 31, for this surface is entirely isolated from the rigid element 60, current flowing through the ring directly through the end of the shaft into and through the disc 41 to the other element.

Figure 5:
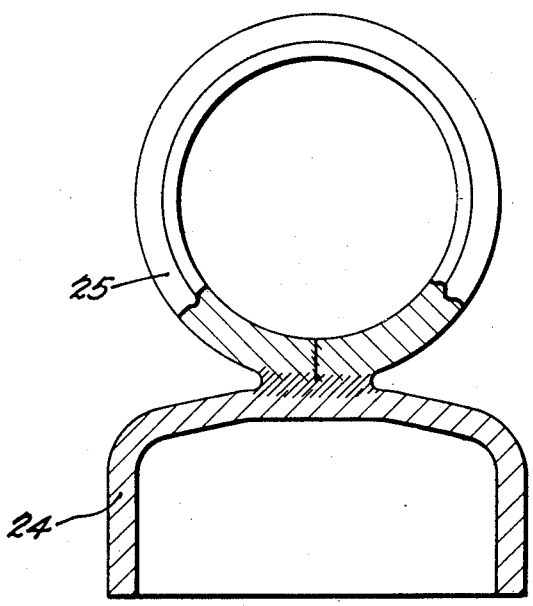
Fig. 5 is a view similar to Fig. 4 showing the assembly of the lower end cover of the shock absorber.

In the Fig. 5 the completed assembly of the lower cup and mounting rings 24 and 25 respectively is clearly illustrated. As shown in Fig. 2, the rigid element 160 has a fixture 161 clamped thereon which is adapted to receive the cup-shaped member 24. The movable element 170 is recessed to receive the ring 25 and move it into pressing engagement with the cup-shaped member 24, contact between the ring 25 and cup-shaped member 24 resulting in a fusion between the engaging surfaces, as is illustrated clearly in Fig. 5.

From the aforegoing it may be seen that applicant has not only provided a shock absorber of simple structure and design, capable of operating efficiently and of being produced commercially at a minimum cost, but he has also provided an improved method and means of so producing said shock absorber. He has provided a method for welding parts together so that the essential highly polished smooth surface of one of the parts is protected against damage during the welding operation.

While the embodiment of the present invention as herein disclosed, constitutes a preferred form, it is to be understood that other forms might be adopted, all coming within the scope of the claims which follow.

What is claimed is as follows:

1. The method of assembling the highly polished piston rod of a hydraulic shock absorber without marring its polish, said rod having a reduced end, which consists of pushing the reduced end of said rod through the central aperture of a relative thin disc, supporting said rod and disc upon a rigid electrode having an insulating sleeve so that the disc electrically engages the electrode, and the rod is insulatingly supported within the sleeve against transverse movement, fitting a ring upon a movable electrode and by actuating said movable electrode, pressing the ring into engagement with the end of the rod protruding from the disc while maintaining the rod longitudinally immovable and causing electric current to flow from one electrode to the other through the ring, rod end and disc whereby adjacent contacting surfaces of said ring, rod and disc are fused and welded together.

2. The method of assembling the highly polished piston rod of a hydraulic shock absorber without marring its polish, said rod having a reduced end which consists of pushing the reduced end of the rod through the central aperture of a relatively thin disc so that it protrudes therefrom, supporting the rod within an insulating sleeve in a stationary electrode while causing the disc to engage said electrode electrically, and while maintaining the rod immovable longitudinally pressing the ring upon the protruding end of the rod by a movable electrode, and causing current to flow from one electrode through the ring, rod and disc to the other electrode.

3. The method of assembling the highly polished piston rod of a hydraulic shock absorber without marring its polish, which consists in pushing one end of the rod through the central aperture of a relatively thin disc so that it protrudes from said disc, rigidly supporting the disc upon a stationary electrode while the rod extends through an insulating sleeve in the electrode and is supported thereby against lateral movement, then placing a ring upon the end of the rod which slightly protrudes from said disc and while maintaining said rod immovable longitudinally pressing said ring upon the rod with a movable electrode while causing electric current to flow from one electrode to the other through the ring, rod and disc, thereby fusing and welding the adjacent surfaces of the rod, ring and disc.

4. The method of assembling the highly polished piston rod of a shock absorber without marring its polish, which consists in pushing one end of the rod into and through the central aperture of a relatively thin disc so that the rod is substantially at right angles with said disc, inserting the rod in an insulating sleeve within a stationary electrode and causing the disc to rest upon said electrode in direct electric engagement therewith while maintaining the proper angular relation between the rod and disc, supporting the end of the rod opposite the disc upon a rigid base, then placing a ring upon the reduced end of the rod and by means of a movable electrode pressing said ring against the end of the rod while causing electric current to flow from one electrode through the ring, rod end and disc into the opposite electrode for fusing and welding adjacent surfaces of the ring, rod and disc.

GEORGE W. ELSEY.